(12) United States Patent
Hedlund

(10) Patent No.: US 9,586,666 B2
(45) Date of Patent: Mar. 7, 2017

(54) PARALLEL OR REDUNDANT HYBRID MARINE DRIVE TRAIN FOR A PROPULSION UNIT

(71) Applicant: Collaparte AB, Hönö (SE)

(72) Inventor: Benny Hedlund, Hönö (SE)

(73) Assignee: Collaparte AB, Höno (SE)

( * ) Notice: Subject to any disclaimer, the term of this patent is extended or adjusted under 35 U.S.C. 154(b) by 0 days.

(21) Appl. No.: 14/892,716

(22) PCT Filed: May 19, 2014

(86) PCT No.: PCT/SE2014/050610
§ 371 (c)(1),
(2) Date: Nov. 20, 2015

(87) PCT Pub. No.: WO2014/189447
PCT Pub. Date: Nov. 27, 2014

(65) Prior Publication Data
US 2016/0114877 A1    Apr. 28, 2016

(30) Foreign Application Priority Data

May 20, 2013  (SE) ...................... 1300360

(51) Int. Cl.
*F16H 37/06* (2006.01)
*B63H 23/16* (2006.01)
(Continued)

(52) U.S. Cl.
CPC ............ *B63H 23/16* (2013.01); *B63H 21/20* (2013.01); *B63H 23/04* (2013.01); *B63H 23/30* (2013.01);
(Continued)

(58) Field of Classification Search
None
See application file for complete search history.

(56) References Cited

U.S. PATENT DOCUMENTS 4,676,352 A * 6/1987 Randolph ............... F16D 21/04
192/108
6,857,918 B1 * 2/2005 Lebreux ............... B63B 35/731
440/6
(Continued)

FOREIGN PATENT DOCUMENTS

| EP | 1426287 A1 | 6/2004 |
|---|---|---|
| FR | 2949751 A1 | 3/2011 |
| WO | 93/05317 A1 | 3/1993 |

OTHER PUBLICATIONS

Sweden Patent and Registration Office, Int'l Search Report in PCT/SE2014/050610, Sep. 25, 2014.

*Primary Examiner* — Dirk Wright
(74) *Attorney, Agent, or Firm* — Piedmont Intellectual Property

(57) ABSTRACT

A parallel or redundant hybrid drive of a marine drivetrain of a propulsion unit includes an input shaft, which is configured to be driven by a primary drive source; a clutch unit attached to the input shaft with which rotation of the input shaft can be either connected, reversed, or disconnected; a countershaft transverse to the input shaft and driven by the input shaft via a gear; and a secondary drive source arranged via an interconnected clutch at an end of the countershaft, so that upon driving of the input shaft by the primary drive source, the secondary drive source drives the countershaft either on its own or in cooperation with the primary drive source.

18 Claims, 2 Drawing Sheets

(51) Int. Cl.
  *B63H 23/30* (2006.01)
  *B63H 21/20* (2006.01)
  *B63H 23/04* (2006.01)
  *B63H 23/02* (2006.01)

(52) U.S. Cl.
  CPC .............. *B63H 2021/202* (2013.01); *B63H 2023/0283* (2013.01); *Y10S 903/91* (2013.01); *Y10S 903/914* (2013.01)

(56) References Cited

U.S. PATENT DOCUMENTS

| | | | | |
|---|---|---|---|---|
| 7,147,523 | B2 * | 12/2006 | Mori | B63H 20/00 440/3 |
| 7,862,393 | B2 * | 1/2011 | Levander | B63H 5/125 440/3 |
| 8,556,668 | B2 * | 10/2013 | Kodera | B63H 21/21 440/3 |
| 9,096,295 | B2 * | 8/2015 | Gemin | B63H 21/22 |
| 2008/0166934 | A1 | 7/2008 | Levander et al. | |
| 2009/0209146 | A1 | 8/2009 | Jegel | |
| 2012/0129411 | A1 | 5/2012 | Kodera et al. | |
| 2012/0252285 | A1 | 10/2012 | Lee et al. | |

\* cited by examiner

PARALLEL OR REDUNDANT HYBRID MARINE DRIVE TRAIN FOR A PROPULSION UNIT

BACKGROUND

The present invention relates to an arrangement for making it possible to achieve a parallell or redundant marine drive train for a propulsion unit. The drive train comprise a housing and an input shaft penetrating the same, which shaft at its one end comprise means to connect the same to a primary drive source, preferably using an Otto- or Diesel cycle. To said shaft a clutch unit is connected, with which the rotation of said input shaft may be connected, reversed or disconnected. Further said drive train comprise on the one hand a transversally to said input shaft arranged countershaft, which is driven by the input shaft via a gear, and secondly a secondary drive source, preferably of an electrical or hydraulical kind, which secondary drive via an intermediary clutch is arranged at a first end of said countershaft, so that dependant upon whether the primary drive source is driven or not, said secondary drive source is driven either to drive the countershaft by itself or in co-operation with the primary drive source.

TECHNICAL FIELD

Specifically the invention relates to an arrangement at inboard- or outboard drive units for water vessels, having appliances for its propulsion including both a primary engine, of Otto- or Diesel type and a secondary engine, preferably of electrical or hydraulical type. The first mentioned engine is supposed to work as a main drive source, while the last mentioned mainly is supposed to work as a temporary drive source, such as during quiet low speed driving such as during docking in or out from harbour or quai sites, or low speed driving in narrow passages. It is of course the purpose to be able to adapt the arrangement according to the invention in size to fit a vide range of vessels, both sailboats and motorboats from a length of between twenty feet up to ships having a length of a hundred feet or more. The arrangement according to the invention is suited for single- as well as, twin-, or multiple arrangments free of choice.

Technical Problem

The starting point of this invention has been, just like for land vehicles, that it should be possible and commersially interesting also to water vessels to make use of hybrid technologies, not least due to the ever increasing prices on fossil fuels. Therefore the invention emanates from the applicant's own patented invention accordning to WO 9305317(A1)-19930318. The original inventive idea of the present invention was to use this solution by therein eliminating the conical transmission 11, 12, and to let the countershaft, here numbered 4, penetrate the transmission housing both at its upper as well as its lower part in order to use this well established technology in a new fashion. To said penetrating parts of the countershaft is one or more alternative engines, such as hydraulical or electrical ones coupled in the upper end thereof, while an appropriate propulsion unit is coupled to the lower end thereof, such as a pivotable sailboatdrive unit, a so called S-drive®, a DuoProp® drive or an IPS® drive unit. By activating the clutches to drive in all possible fashions, just as if they work in a reversing gear, a propulsion may be accomplished either by use of the ignition engine (primary drive source) either forwards or backwards, or by the alternative engine (-s) (secondary drive source(-s)). When driving by making use of the secondary drive source, when the primary drive source is either shut down or idling and as for instance as a consequence of a suddenly in the driving direction or sideways appearing obstacle a sudden need for reversing or quick stop emerges, a troublesome situation is at hand. This is especially troublesome if the secondary drive source is of a primary magnetised kind. The propeller, especially if they are two of the counterrotating kind, represents together with the overall transmission as such a considerable inertia having the wrong direction, which an engine of said kind will not stand for, especially not in the long run.

State of the Art

The situation from studying the prior art shows, however, that technoly of similar kind was previously developed. From the studied material one publication has shown to be of an extra significant interest, namely EP 1 426 287 A1. Said publication shows a hybrid propulsion drive unit for a water vessel which seems to be based on previously known constructions of inboard/outboard drive units. The internal combustion engine has been supplemented with an electrical motor which may be arranged either before the input shaft of an INU-drive or atop of the transmission housing of the same to have the input shaft thereof coinside with the vertical shaft of the drive unit and may be driven either together with the internal combustion engine or separately. For its function the construction will require a clutch 3d, the more detailed construction of which to the detrimental effect of the scope of protection given by the publication, is not demonstrated in the publication. The solution according to the publication comprise a generator for generating energy necessary for running the electric motor The idea with the hybrid concept according to the present invention has been to simplify the technolgy as far as possible in order to keep the development costs down and to thereby keep the total cost and the final price for the concept at a level that the market would be ready to accept both in the short term and in the long run. The choice has thereby, as pointed out above, fallen on using a permanently magnetised motor (PMM) as a secondary motor, not least since such reasonably simply are able to work as a generator instead of a motor. Thereby one of the components included in the solution according to the above mentioned EP-publication be eliminated. A PMM rotates at rated voltage with a high speed/rpm, between three and four times higher than the speed of the primary engine. The efficiency is simultaneously supposed to be around 20-40% of that of the primary drive unit, which is why the supplied speed of the PMM has to be adapted to the propellercurve for the speed interval that the PMM is supposed to act in. Specifically regarding boats or ships able to act in a speed interval of up to 40 knots, the idling speed is normally the idling speed on or around 5 knots, ie. an eighth.

Therefore it is an object with the present invention to show and allot a solution to how an in itself mechanically simple electrical engine applied to a propulsion unit of a water vessel is to co-operate with previously known technology for said propulsion, mainly internal combustion engines of different kinds, to achieve an in the context reliable and well functioning system that can obtain positive effects both on fuel economy, riding comfort, local harbour environment and the overall environment.

According to the invention this main object is reached by arranging each clutch unit in such a way that when changing between the forward direction and backward direction and vice versa, they shortly brake the rotation, whereby the negatively influencing inertia from transmission and propellers is considerably reduced, which unattended although shortly anyhow every time rotational direction is changed lead to a too high magnetising current in a primary magnetised motor. As a bonuseffect in this context the short braking of the rotation when changing rotational direction can be used to achieve a smooth change between forward and reverse direction also when using an internal combustion engine only for a drive unit.

By the fact that the or each of the extra engines are arranged in such a fashion that that they by the aid of a clutch may be directly connected to the countershaft of of the drive unit, a large amount of mass is eliminated that otherwise would have been needed if the extra motor would have been placed between the primary engine and the transmission in order to handle all the momentum from the primary engine to the tranmission.

Further although a secondary engine that is arranged coaxially between the primary engine and the transmission may be geared up and down, which could lead to a cut in outer measures with regard to the engine, such an arrangement would on the other hand necessitate an extra gearbox between the primary engine and the transmission, which gearbox atop of all would have to be able to be decoupled, which in both cases would increase both weight and cost.

DESCRIPTION OF THE DRAWINGS

The invention will in the following be described with reference to the embodiments thereof shown on the enclosed drawings, in which.

DETAILED DESCRIPTION

Figure 1:
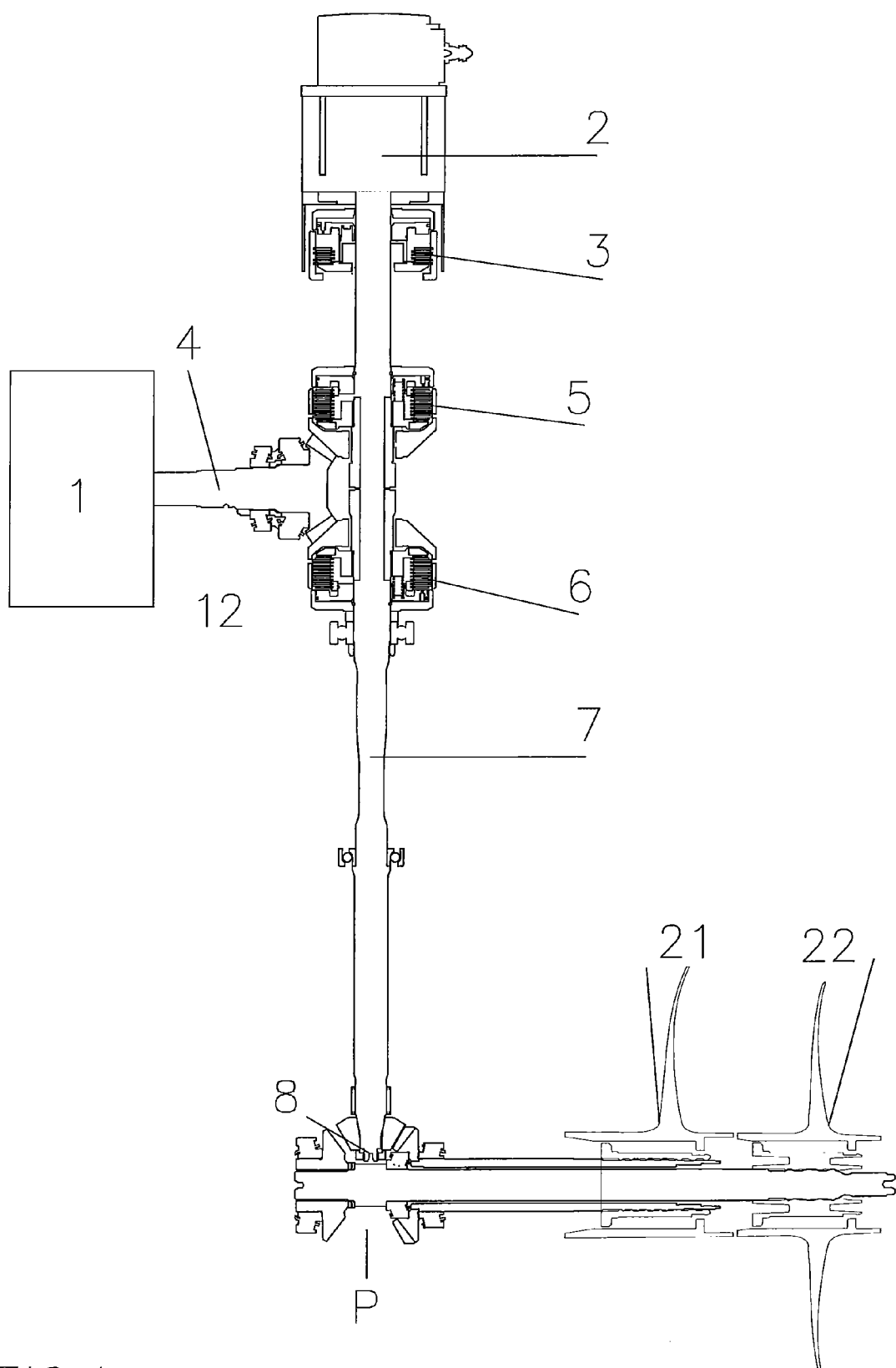
FIG. 1 shows a simplified cross section over the inventive concept with its engines and propulsion unit.

In FIG. 1 an embodiment in its simplest form is depicted. This embodiment comprise a primary drive source 1, a shaft 4 which devolves into a pinion of a conical gear 12, in the vicinity of which a couple of cluthes 5, 6 are journalled on a countershaft 7. At the coaxial extension end of the driven shaft of said clutch 5, a secondary drive source is located, preferably an electric or hydraulic motor, having a between said countershaft 7 and the drive source 2 arranged electrically or hydraulically manouvred releasable clutch 3. At the other end of said transmission 12, the clutch 6 is located, also this in a coaxial relationship with the shaft 7. In the embodiment shown the shaft 7 leads on to a double conical gear 8, which together with double counter-rotating propellers 21, 22 driven by said gear 8, establish an extraordinarily efficient propulsion unit.

Figure 2:
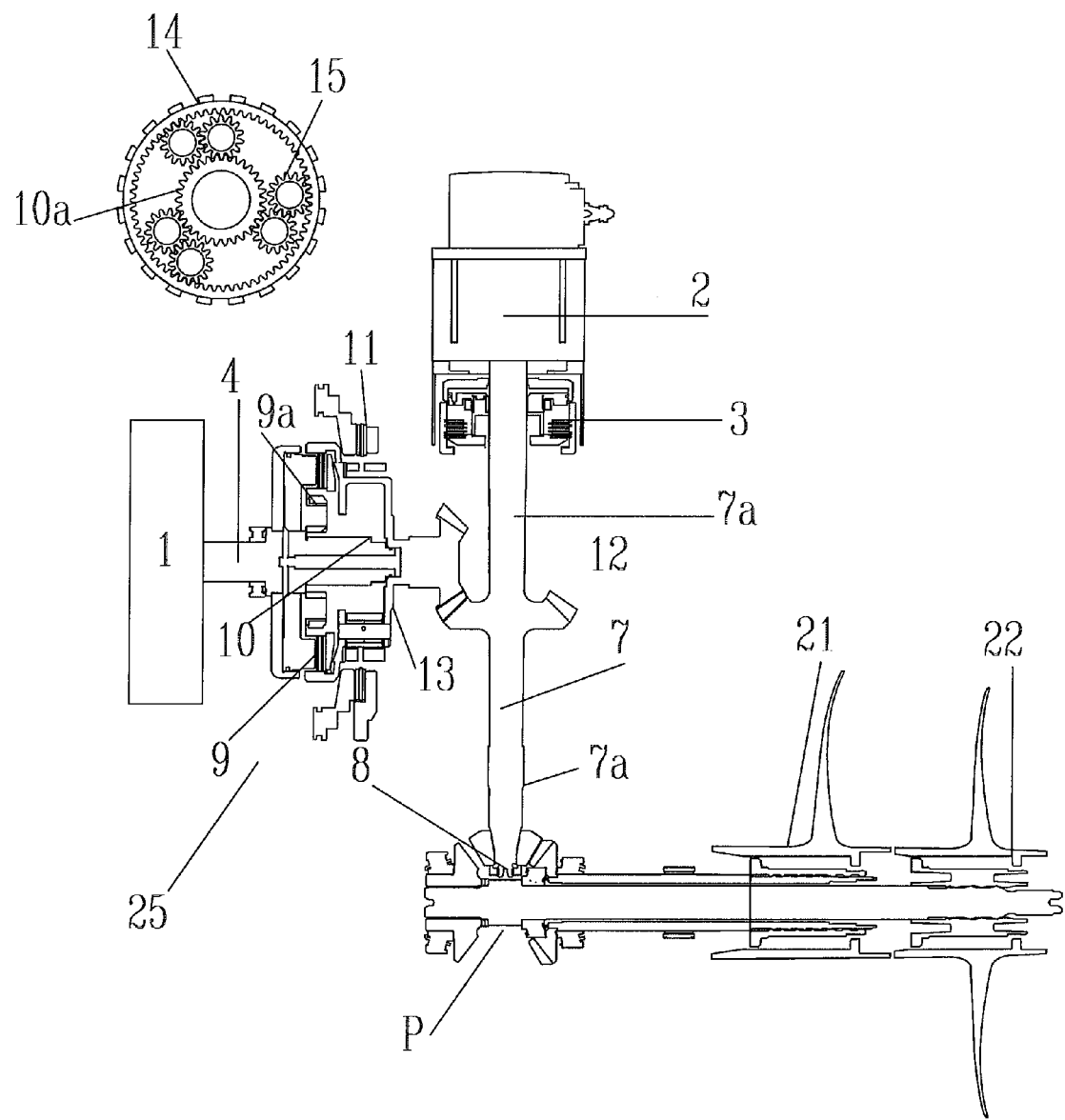
FIG. 2 shows a simplified plan over a drivetrain according to the invention in an alternative configuration as compared to the embodiment shown in FIG. 1.

In an alternative a bit more advanced embodiment as shown i FIG. 2, the invention comprise a primary drive source 1 corresponding to that of the first embodiment, while the shaft 4 constitutes the input shaft of a planetary gear 25 and along its length also include a friction disc carrier 9a of a clutch 9 in said planetary gear 25. The shaft 4 continues after said friction disc carrier and devolves in the planetary gear 25 in a sun wheel 10a provided with gearteeth. The housing (not shown) of the planetary gear 25 comprise a brake 11 for the ring wheel 14 of the planetary gear 25. The shaft 13 is thereafter coupled to a conical gear 12 of the same kind as that shown in the first embodiment. Apart from the fact that this embodiment of the invention for obvious reasons lack the clutches 5 and 6 which are arranged co-axially on and around the countershaft 7, the second embodiment is in all other parts identical to the first embodiment.

The embodiment shown in FIG. 2 thus differs from that shown according to FIG. 1 in that it on the one hand lacks the cluthes 5, 6 on the shaft 7 and on the other hand in that it has a planetary gear on the shaft 4 before the transmission 12. The planetary gear 25 comprise in order to achieve a direct drive making use of the primary drive source 1, the coupling 9, which when closed makes the gear teeth of the planetary gear 25 planet portion, ie. ring wheel 14, planetary wheel 15 and sun wheel 10a be loaded statically and thus follow the rotation of the engine, which will positively affect life and durability of the gear. In order to reverse making use of the primary drive source, the brake 11 is brought to engage, preferably with the use of hydraulic means, in order to reduce the speed of the ring wheel to thereby force the planetary gears to rotate, whereby the rotaional direction of the output shaft from the planetary gear is reversed and thus reversation becomes a fact. Other ways of manouvering the brake 11 except for hydraulics, such as by electrical or mechanical means, are of course also possible.

In the following context the function of the marine drive line according to the invention will be further elucidated. Starting with he emebodiment according to FIG. 1 it can be stated that the drive line is constructed in such a fashion, that if the secondary drive 2 and its clutch 3 did not exist, the drive line would work as a conventional INU drive comprising a sligthly differenty constituted reversing gear, made up from the clutches 5 and 6. Either the one or the other of said cluthes 5, 6 has to be engaged for making a drive forwardly or rearwardly possible. In a case where neither of the clutches are engaged, the shaft 7 will be completely disengaged. Since this is possible, it is also possible to let an engine 2 operate on the shaft 7, being disconnected from the engine 1, making use of a clutch 3. The engine 2 is reversed making use of electrical polarity reversal.

The secondary drive source is as previously mentioned constituted from a primary magnetised motor PMM, which if it is connected at the same time as the primary engine, may run either as an engine/motor or as a generator. The PPM may work as a generator up to its maximum rpm. Above this limit the field voltage of the PMM will exceed the blueprint voltage for its running as a motor, which is unsuitable, so the rpm must be limited, either by making use of the clutch 3 or by the use of a suitable reduction. The current voltage while it is being run as a generator is mainly linear to the rpm with which it is driven. If the field voltage therefore substantially increases the blueprint voltage, the drive electronics may be at risc of being knocked out and arcings may occur in the field winding, which likely will lead to a total failure. The same happens if the boat or the ship is being towed at high speed, whereby the propeller/-s as a consequence of it/they being run as a turbine may get the PMM to overspeed, which in a corresponding fashion probably will lead to a failure of a corresponding kind. During such circumstances the rpm of the PMM must either be lowered to zero or reduced, which may be realised on many ways which we refrain from discussing here and now. When driving making use of the secondary drive source and a sudden need for reversing or reversation emerges, however, account must be taken to the mass inertia, which the parts like in the counterrotating direction in rotation put propellers and their transmission parts represent. Depent upon whether in this circumstance the primary engine is running or not, according to the case with the solution as shown in FIG. 1 either one of the cluthes 5 or 6, or in the planetary gear case according to FIG. 2, the clutch 9 or the brake 11 be used to reduce the rotation of the propellers to a value that either the electrical motor can cope with having regard to the voltage, or the hydraulic engine can handle with regard to pressurisation, without causing operational problems both in short terms and in the long run. With an embodiment according to FIG. 2, a possibility to at low speed control the outgoing speed of the shaft 4 in both directions, ie. both forward and reverse, is obtained. This is accomplished by making it possible to control the application pressure of the brake 11 or the clutch 9 to an rpm that is lower than the idling rpm of the primary engine. Beyond this, a skilled person should realise that the drivetrain in both its embodiments can be used to grant a gear change from hog speed forward or rearward to its opposite, in that it becomes possible to by braking reduce said mass inertia, which is a consequence of the rotation of the masses contained in the transmission- and propulsionelements. This also leads to a considerable improvement of the riding comfort when driving a boat or a ship that is equipped with one or more INU-units of the described type, and this completely independently of whether the drive train is of hybrid type or is of the conventional kind. Apart from this it should be realised that variants of the shown embodiments may be understood and be exerted by such people that this publication is directed to while exerting the invention starting from a study of the drawings, the description and the enclosed patent claims. In the claims the word "includes" does not exclude the possible presence of other steps or elements and the indefinite article a/an does not exclude the existence of a feature in plural. The fact that certain features have been mentioned in different dependant claims is not an indication of that a combination can not be used to the advantage of the applicant.

Change of Rotational Direction in Drive Source 2

The secondary drive source 2 rotational direction as a primary magnetised motor (PMM) is simply changed for change between drivning forwards or backwards by a polarity reversal of its field winding. In order to achieve this in the most convenient fashion not causing current surge, the voltage is disconnected at the same time as in the case that the primary engine is stopped and the clutches 5 or 6 are used to reduce the rotation of the propellers 21, 22, so that after the the shaft 7 has reached a predetermined rpm, a polarity reversal to the new rotational direction can be made without any danger. This goes for both the described embodiments. For the embodiment making use of a planetary gear according to FIG. 2, either the cluth 9 or the brake 11 is used for said reduction of the rotation.

In the case where the main engine 1 is driven with a low rpm, on a short term basis, that clutch or brake is chosen that gives the new rotational direction wanted. In this manner said load on the secondary drive source 2 is deminished or even eliminated.

When driving using the secondary drive source and a sudden need for reversal emanate, the inertia that the in the opposite direction rotating propeller/-s represent has to be taken into account. Dependent upon whether in this situation the primary drive source 1 is running or not, in the case according to FIG. 1 either one of the clutches 5 or 6 or in the planetary gear case either the clutch or the brake 11, may be used to brake the rotation of the propellers to an rpm value that the motor can handle with regard to the voltage in order to avoid operational problems either on the long run or in a shorter term. In an embodiment with this kind of configuration also a possibility to at low rpm:s control the rpm of the output shaft 13 in both rotational directions, ie. both forwardly and backwardly. This is done by making it possible to control the application pressure in the brake 11 or the clutch 9 to an rpm that is lower than the idling speed of the primary drive source 1.

Apart from this it should be noted that variants of the shown embodiments may be understood and be exerted by such people that this publication is directed to while exerting the invention starting from a study of the drawings, the description and the enclosed patent claims. In the claims the word "comprise" does not exclude the possible presence of other steps or elements and the indefinite article a/an does not exclude the existence of a feature in plural. The fact that certain features have been mentioned in different dependant claims is not an indication of that a certain combination can not be used to the advantage of the applicant.

SPECIFICATION OF DETAILS

1. Primary drive source
2. Secondary drive source
3. Clutch
4. Shaft
4' Output shaft from planetary gear
5. Clutch
6. Clutch
7. Countershaft
8. Twin conical gear
9. Clutch (planetary gear, direct drive)
9a friction disc carrier
10. Shaft
11. Brake for reversal when reversing
12. Conical gear
13. Planetary gear carrier
14. Ring wheel
15. Planetary gear
21, 22 Counterrotating propellers
25 Planetary gear The invention claim is:

1. A parallel or redundant marine drive train for a propulsion unit, comprising:
   an input shaft configured to be driven by a primary drive source;
   a clutch unit coupled to the input shaft, wherein the clutch unit selectively connects, reverses, or disconnects rotation of the input shaft, wherein the clutch unit is configured, in conjunction with a shift between forward and reverse positions, momentarily to brake the rotation;
   an output shaft transverse to the input shaft and driven by the input shaft via a gear; and
   a secondary drive source arranged via a clutch at one end of the output shaft such that, depending on whether the input shaft is driven or not, the secondary drive source runs either on its own or in cooperation with the primary drive source.

2. The drive train of claim 1, wherein the clutch comprises either a hydraulically or electrically applied clutch configured for connecting or disconnecting either the primary drive source or the secondary drive source.

3. The drive train of claim 1, wherein the secondary drive source comprises an electric motor/generator that operates as a motor or a generator depending on voltage polarity and rotational direction.

4. The drive train of claim 1, wherein the clutch unit comprises a plurality of clutch units journalled at each side adjacent to the gear on the output shaft and configured such that when at least one of the plurality of clutch units is applied, the output shaft and thereby the gear is reversibly driven by the primary drive source, and such that when none of the plurality of clutch units is applied, the output shaft and thereby the gear is reversibly driven by the secondary drive source.

5. The drive train of claim 1, wherein the clutch unit comprises a planetary gear arranged on the input shaft, the planetary gear having at least one ratio and being configured selectively to transfer force and momentum to the output shaft in a same or opposite rotational direction of the input shaft and selectively to disconnect the output shaft from the primary drive source.

6. The drive train of claim 1, wherein the drive train is configured to connect or disconnect the primary drive source while the secondary drive source is driven.

7. The drive train of claim 1, wherein the clutch unit comprises a dry or wet centrifugal clutch that is arranged either adjacent to the gear on the output shaft or on the input shaft.

8. The drive train of claim 7, wherein the clutch comprises either a hydraulically or electrically applied clutch configured for connecting or disconnecting either the primary drive source or the secondary drive source.

9. The drive train of claim 7, wherein the secondary drive source comprises an electric motor/generator that operates as a motor or a generator depending on voltage polarity and rotational direction.

10. The drive train of claim 7, wherein the clutch unit comprises a plurality of clutch units journalled at each side adjacent to the gear on the output shaft and configured such that when at least one of the plurality of clutch units is applied, the output shaft and thereby the gear is reversibly driven by the primary drive source, and such that when none of the plurality of clutch units is applied, the output shaft and thereby the gear is reversibly driven by the secondary drive source.

11. The drive train of claim 7, wherein the clutch unit comprises a planetary gear arranged on the input shaft, the planetary gear having at least one ratio and being configured selectively to transfer force and momentum to the output shaft in a same or opposite rotational direction of the input shaft and selectively to disconnect the output shaft from the primary drive source.

12. The drive train of claim 7, wherein the drive train is configured to connect or disconnect the primary drive source while the secondary drive source is driven.

13. The drive train of claim 1, wherein the clutch unit comprises a planetary gear arranged on the input shaft.

14. The drive train of claim 13, wherein the clutch comprises either a hydraulically or electrically applied clutch configured for connecting or disconnecting either the primary drive source or the secondary drive source.

15. The drive train of claim 13, wherein the secondary drive source comprises an electric motor/generator that operates as a motor or a generator depending on voltage polarity and rotational direction.

16. The drive train of claim 13, wherein the clutch unit comprises a plurality of clutch units journalled at each side adjacent to the gear on the output shaft and configured such that when at least one of the plurality of clutch units is applied, the output shaft and thereby the gear is reversibly driven by the primary drive source, and such that when none of the plurality of clutch units is applied, the output shaft and thereby the gear is reversibly driven by the secondary drive source.

17. The drive train of claim 13, wherein the planetary gear has at least one ratio and is configured selectively to transfer force and momentum to the output shaft in a same or opposite rotational direction of the input shaft and selectively to disconnect the output shaft from the primary drive source.

18. The drive train of claim 13, wherein the drive train is configured to connect or disconnect the primary drive source while the secondary drive source is driven.

* * * * *